(12) United States Patent
Nuara et al.

(10) Patent No.: US 11,125,320 B2
(45) Date of Patent: Sep. 21, 2021

(54) GEAR LEVEL FOR A MOTOR-VEHICLE GEARBOX

(71) Applicant: FCA Italy S.p.A., Turin (IT)

(72) Inventors: Vincenzo Nuara, Turin (IT); Dario Luvison, Turin (IT); Paolo Mancin, Turin (IT)

(73) Assignee: FCA Italy S.p.A., Turin (IT)

( * ) Notice: Subject to any disclaimer, the term of this patent is extended or adjusted under 35 U.S.C. 154(b) by 0 days.

(21) Appl. No.: 16/868,107

(22) Filed: May 6, 2020

(65) Prior Publication Data

US 2020/0355260 A1 Nov. 12, 2020

(30) Foreign Application Priority Data

May 8, 2019 (EP) .................................. 19173257

(51) Int. Cl.
*F16H 59/10* (2006.01)
*F16H 59/12* (2006.01)
*F16H 61/22* (2006.01)

(52) U.S. Cl.
CPC ............. *F16H 59/10* (2013.01); *F16H 59/12* (2013.01); *F16H 61/22* (2013.01)

(58) Field of Classification Search
CPC ............. F16H 59/10; F16H 59/12; F16H 1/22
See application file for complete search history.

(56) References Cited

U.S. PATENT DOCUMENTS

| | | | | |
|---|---|---|---|---|
| 3,998,109 A | | 12/1976 | O'Brien | |
| 4,474,085 A | * | 10/1984 | DeVogelaere | F16H 59/10 477/99 |
| 4,612,820 A | | 9/1986 | Behrens | |
| 5,179,870 A | * | 1/1993 | Behrens | B60K 20/02 74/473.23 |
| 5,263,383 A | * | 11/1993 | Meisch | F16H 59/10 403/326 |
| 7,000,497 B1 | * | 2/2006 | Campbell | F16H 59/0278 74/525 |
| 2008/0000314 A1 | * | 1/2008 | Reppuhn | F16H 59/10 74/473.21 |
| 2014/0318297 A1 | * | 10/2014 | Scheiblecker | B60W 10/11 74/473.23 |
| 2020/0355260 A1 | * | 11/2020 | Nuara | F16H 61/22 |

FOREIGN PATENT DOCUMENTS

DE 8700977 U1 5/1987
DE 8700977 U1 5/1987

OTHER PUBLICATIONS

European Search Report dated Sep. 23, 2019. 3 pages.

* cited by examiner

*Primary Examiner* — David M Fenstermacher
(74) *Attorney, Agent, or Firm* — RMCK Law Group PLC (57) ABSTRACT

A gear lever for a motor-vehicle gearbox includes an elongated body, an actuating member arranged on the elongated body and a transmission member arranged within an inner passage of the elongated body. The transmission member is operatively connected to the actuation member and is configured to transmit movement of the actuation member to a controlled member.

16 Claims, 6 Drawing Sheets

GEAR LEVEL FOR A MOTOR-VEHICLE GEARBOX

CROSS-REFERENCE TO RELATED APPLICATION

This application claims priority to European Patent Application No. 19173257.7 filed May 8, 2019. The disclosure of the above application is incorporated herein by reference in its entirety.

FIELD OF THE INVENTION

The present invention relates to a gear lever for controlling a motor-vehicle gearbox of the type comprising:
an elongated body
an actuating member arranged on the elongated body of the gear lever,
a transmission member arranged within an inner passage of the body of the gear lever, operatively connected to said actuating member and configured to transmit the movement of the actuating member to a controlled member.

PRIOR ART

Figure 1:
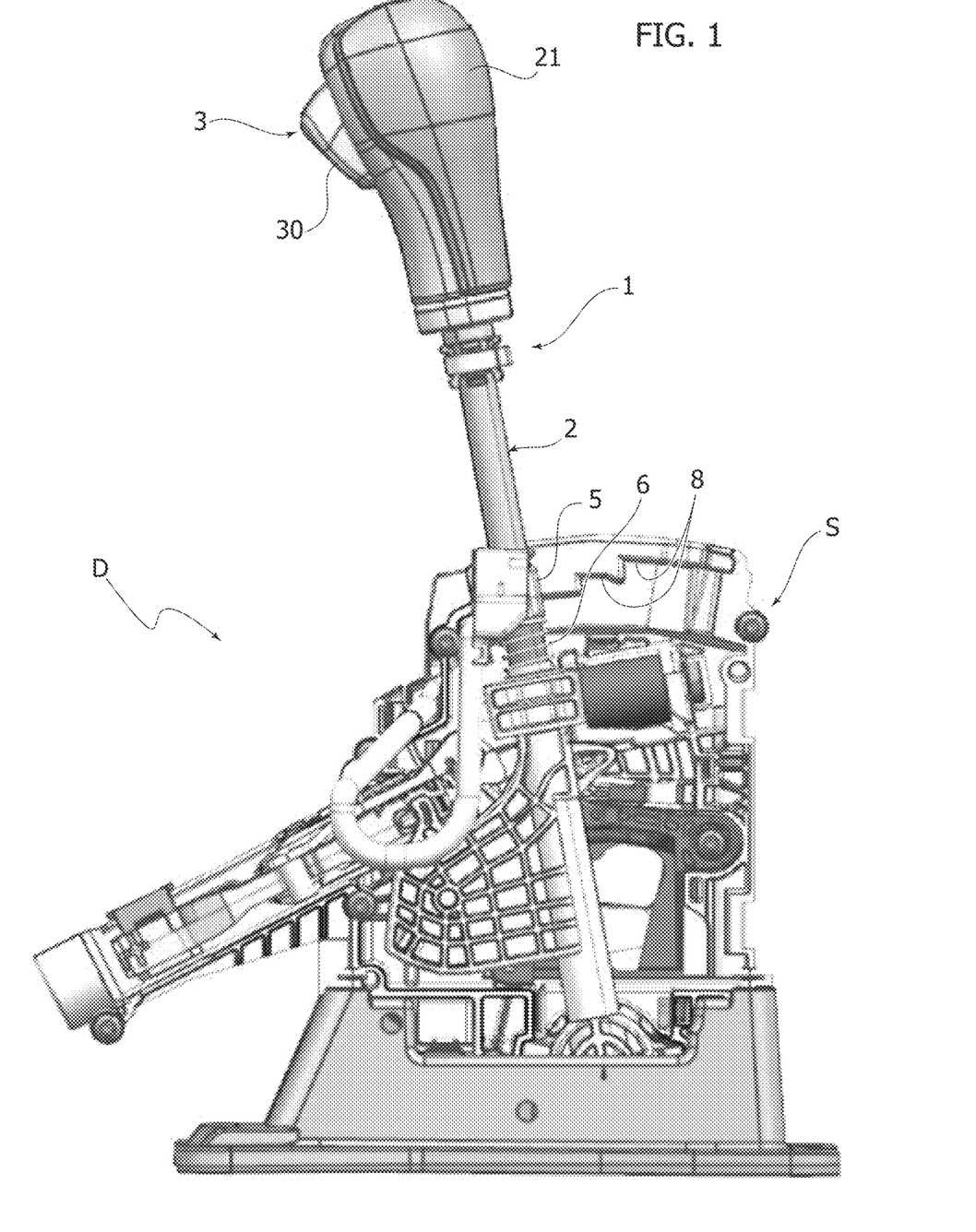
FIGS. 1 and 2, already described above, illustrate a known gear lever for a motor-vehicle gearbox, considered here.
Figure 2:
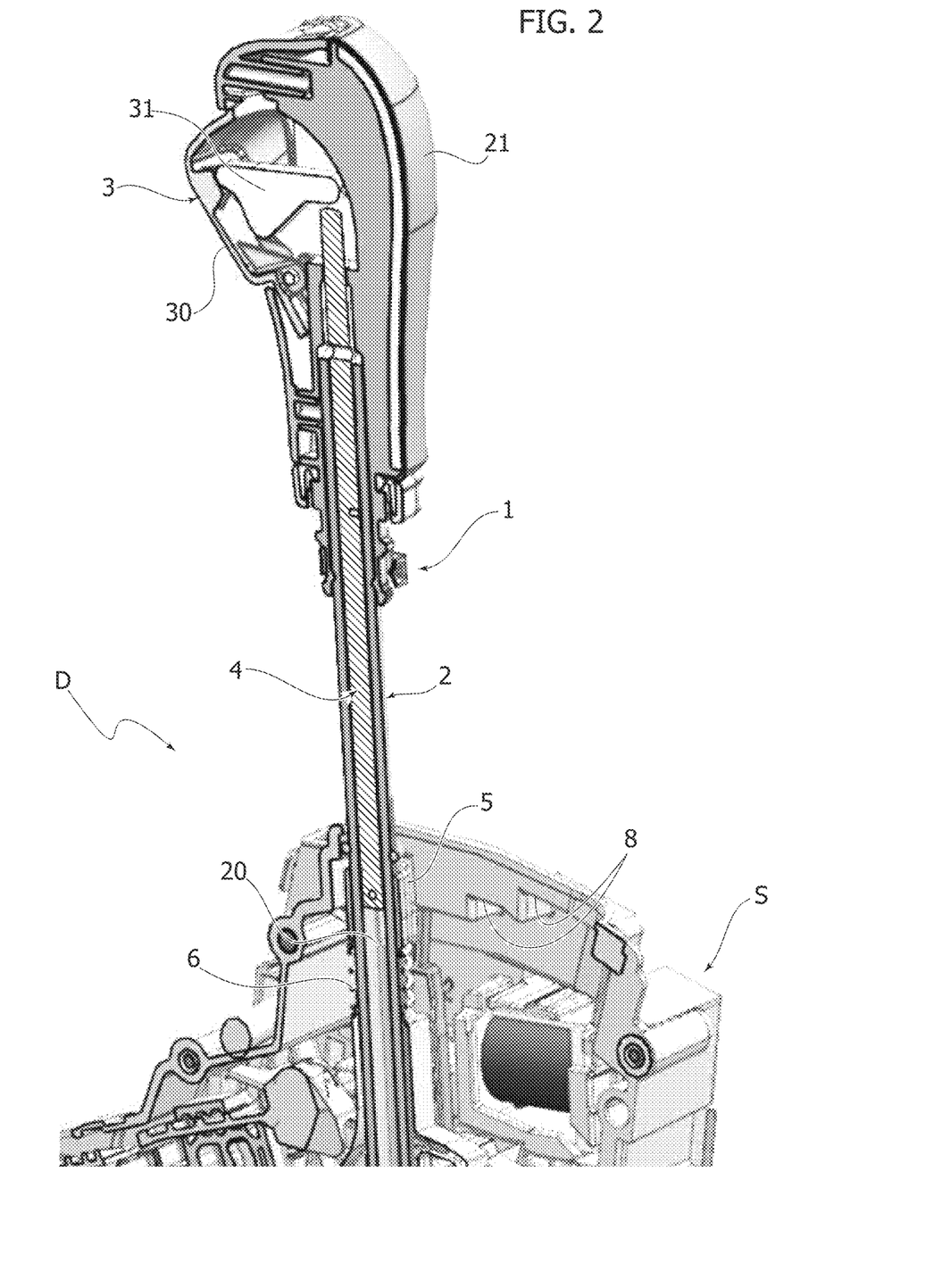
Figure 3:
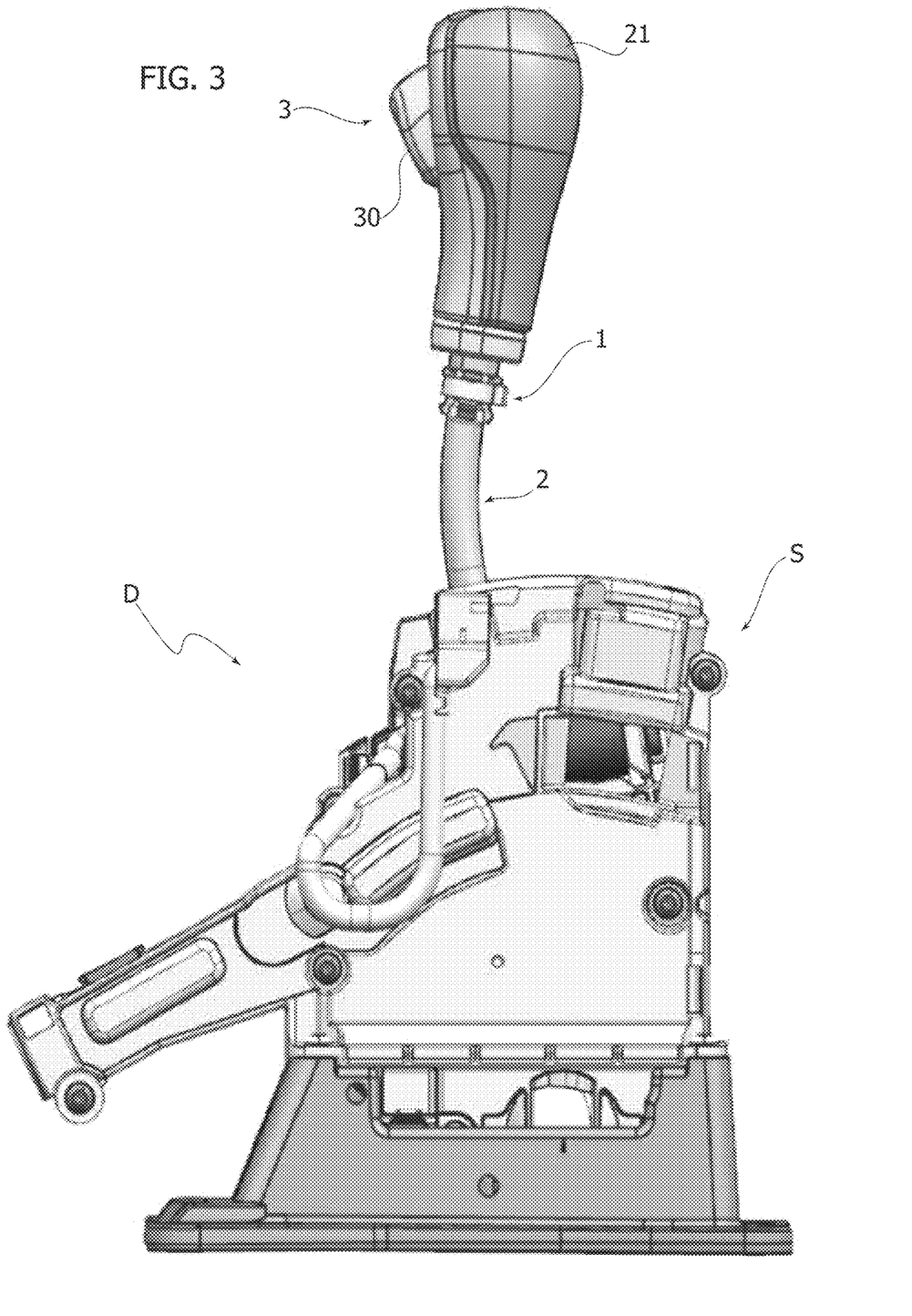
FIG. 3 is a side view illustrating a preferred embodiment of the present invention.

FIGS. 1 and 2 of the attached drawings show a known gear lever of the type specified above, which was developed in the past by the same applicant. In particular, FIGS. 1 and 2 are, respectively, a partially cross-sectioned side view of the known gear lever and a cross-sectioned perspective view illustrating the lever of the preceding figure on an enlarged scale.

The reference number 1 indicates—in its entirety—a gear lever for a motor-vehicle gearbox. The gearbox controlled by the gear lever 1 can be of any known type, for example, an automatic gearbox or a robotic gearbox.

The gear lever 1 is mounted pivoting above a support structure S which can be anchored to the floor of the motor-vehicle, in such a way that the lever 1 can be rotated towards the front (with reference to the direction of travel of the motor-vehicle) or backwards, to reach a plurality of operating positions, for example, "parking", "drive", "neutral" and "reverse" positions. The constructive details relating to the way in which the support structure can be anchored to the floor of the motor-vehicle and how the gear lever is mounted on the support structure, are not presented here, since these details can be made in any known way and, also, as elimination of these details from the drawings makes them more readily and easily understood.

The lever 1 has an elongated body 2, with a substantially circular cross-section, having a lower portion arranged within the support structure S and an upper portion equipped at one end with a handle 21, to allow movement of the lever 1.

The elongated body of the lever 1 comprises an actuating member 3 operatively connected to a transmission member 4 and configured to transmit a movement of the actuating member 3 to a controlled member 5. In the example shown in FIGS. 1 and 2, the controlled member 5 is an engaging member elastically biased into a locking position, for locking the gear lever 1 in one of the aforesaid operating positions. The controlled member 5 is arranged outside the elongated body 2, in the vicinity of its lower portion arranged within the support structure S, and the locking positions are defined by a plurality of seats 8 formed within the support structure S.

Still with reference to the example illustrated in FIGS. 1 and 2, the actuating member 3 is arranged at the handle 21 and comprises a push-button 30 projecting from the handle 21, and an operating arm 31 arranged pivoting within the handle 21 and interposed between the push-button 30 and the transmission member 4, so as to transmit a movement of the push-button 30 to the transmission member 4.

As illustrated in the cross-sectional view of FIG. 2, the transmission member 4 is arranged within an inner passage 20 of the elongated body 2 of the gear lever 1. Still with reference to the illustrated example, the transmission member 4 is a rigid rod extending and slidably mounted within the inner passage 20 of the elongated body 2. The rigid rod has an upper end in contact with the actuating member 3, in particular with the operating arm 31, and a lower end operatively connected to the controlled member 5.

As indicated above, the controlled member 5 is an engaging member elastically biased into a locking position defined by one of the seats 8 of the support structure S, for locking the gear lever in an operative position. In order to elastically recall the controlled member 5 into a locking position, the lever 1 comprises spring means 6 arranged in contact with the controlled member 5, to recall the engaging member 5 into the aforesaid locking position. In the example concretely illustrated in FIGS. 1 and 2, the elastically biased engaging member is a stop element shaped like a bushing, mounted to slide outside the elongated body 2 close to its lower portion arranged within the elongated body 2. The spring means 6 comprise a helical spring mounted around the body 2 and interposed between the bushing 5 and a fixed supporting element, carried by the support structure S.

With reference to the gear lever 1 described above, the operation of the lever 1 will now be described when actuated to vary its operating position. Following a pressure applied on the push-button 30, the operating arm 31 rotates around an axis perpendicular to the main axis of the elongated body 2, so as to apply a pressure force on the upper end of the rigid rod. Following this pressure force, the rigid rod slides within the inner passage 20 of the body 2, towards the support structure S. Sliding of the rigid rod carries the engaging member 5 away from the locking position defined by one of the seats 8 and, consequently, the gear lever 1 can be rotated freely forwards or backwards to vary its operating position. Once the lever is in the required operating position, following the release of the push-button 30, the engaging member 5 is elastically biased by the spring means 6 within the seat 8 corresponding to the new operating position of the lever 1.

The known solution described above necessarily implies that the gear lever of the gearbox has a straight elongated body, to allow a sliding movement of the transmission rod 4. This constraint in the design of the gear lever of the gearbox is considerably penalizing, since—on the contrary—it is felt necessary to be able to adopt any configuration for the gear lever of the gearbox, including—in particular—a curved configuration, to be able to adapt it optimally to the specific characteristics of the vehicle, or of the vehicles, for which the gear lever is intended, and also in such a way as to always be able to fully satisfy the positioning needs and the way of using the lever that are also optimal in terms of ergonomics.

OBJECT OF THE INVENTION

The object of the present invention is to improve the gear levers of the known type described above, by providing a gear lever that can have any configuration of its elongated body, including a curved configuration, so that it can be optimally adapted to the specific characteristics of the vehicle, or vehicles, on which the gear lever of the gearbox is intended to be used, and also in order to always be able to fully satisfy the positioning needs and the way of using the lever that are also optimal in terms of ergonomics.

A further object of the invention is to achieve the aforesaid objective with a gear lever of the gearbox that has reduced dimensions, is constructively simple and cheap.

SUMMARY OF THE INVENTION

With a view to achieving these objects, the invention relates to a gear lever for a motor-vehicle gearbox having the characteristics indicated at the beginning of the present description and further characterized in that the aforesaid transmission member comprises a plurality of spherical elements arranged in series within the aforesaid inner passage of the elongated body of the gear lever.

Thanks to this characteristic, the shape of the elongated body of the gear lever may have any configuration, including a curved configuration, so that it can be optimally adapted to the specific characteristics of the vehicle, or vehicles, on which it must be installed and so as to always meet the requirements of maximum ergonomics of the positioning and the actuating mode of the lever. The use of a transmission member including a series of spherical elements indeed allows the correct operation of the transmission between the actuating member and the controlled member, even in the case in which the train constituted by the spherical elements must move within a curved passage.

Preferably, the spherical elements have a diameter substantially corresponding to the inner diameter of the inner passage of the elongated body, and are arranged in mutual contact within the elongated body along its main axis.

Still according to a preferred embodiment, the transmission member further comprises a first rigid rod, slidably mounted within the inner passage of the elongated body and operatively interposed between the actuating member and the spherical elements, and a rigid terminal rod, in which the spherical elements are interposed between said first rigid rod and said terminal rod.

Preferably, the spherical elements are of metal material, in particular, of steel and are lubricated to facilitate sliding within the elongated body of the gear lever.

BRIEF DESCRIPTION OF THE DRAWINGS

Further characteristics and advantages of the invention will become apparent from the description that follows with reference to the attached drawings, provided purely by way of non-limiting example, wherein.

DESCRIPTION OF A PREFERRED EMBODIMENT

In the following description, various specific details are illustrated aimed at a thorough understanding of the embodiments. The embodiments can be implemented without one or more of the specific details, or with other methods, components, materials, etc. In other cases, structures, constructive details, materials or known operations are not illustrated and described in detail, since they can be produced in any known way and also because they do not fall within the scope of the present invention.

FIGS. 3-6 illustrate a preferred embodiment of a gear lever for a motor-vehicle gearbox according to the present invention. In FIGS. 3-6, the various parts in common with the lever previously described are indicated with the same references used in FIGS. 1 and 2

In the case of the invention, the gear lever can be arranged for a motor-vehicle gearbox of any type, for example, an automatic gearbox or robotic gearbox.

In a manner very similar to the gear lever described in FIGS. 1 and 2, the gear lever 1 according to the invention comprises an elongated body 2, an actuating member 3 arranged on the elongated body 2 of the gear lever 1 and a transmission member 4 arranged and slidably mounted within an inner passage 20 of the body 2 of the gear lever.

As previously stated for the gear lever of the known type described in FIGS. 1 and 2, the transmission member 4 is operatively connected to the actuating member 3, and is configured to transmit the movement of the actuating member 3 to a controlled member 5.

According to an essential characteristic of the present invention, the transmission member 4 comprises a plurality of spherical elements 40 arranged in series within the inner passage 20 of the elongated body 2 of the gear lever 1.

Figure 4:
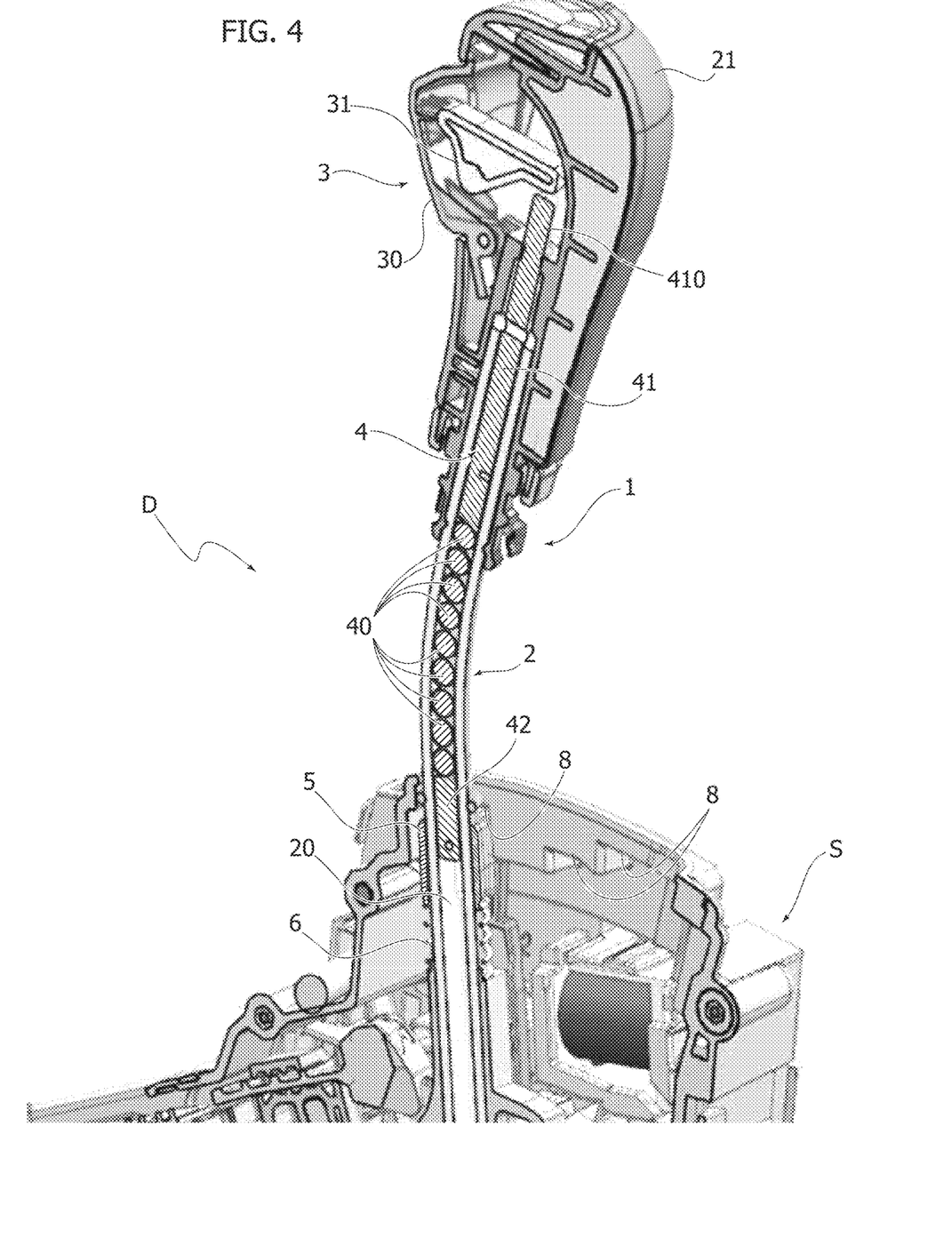
FIGS. 4, 5 are further representations of the lever of FIG. 3, illustrated in a cross-sectioned perspective view and a cross-sectioned side view, respectively.
Figure 5:
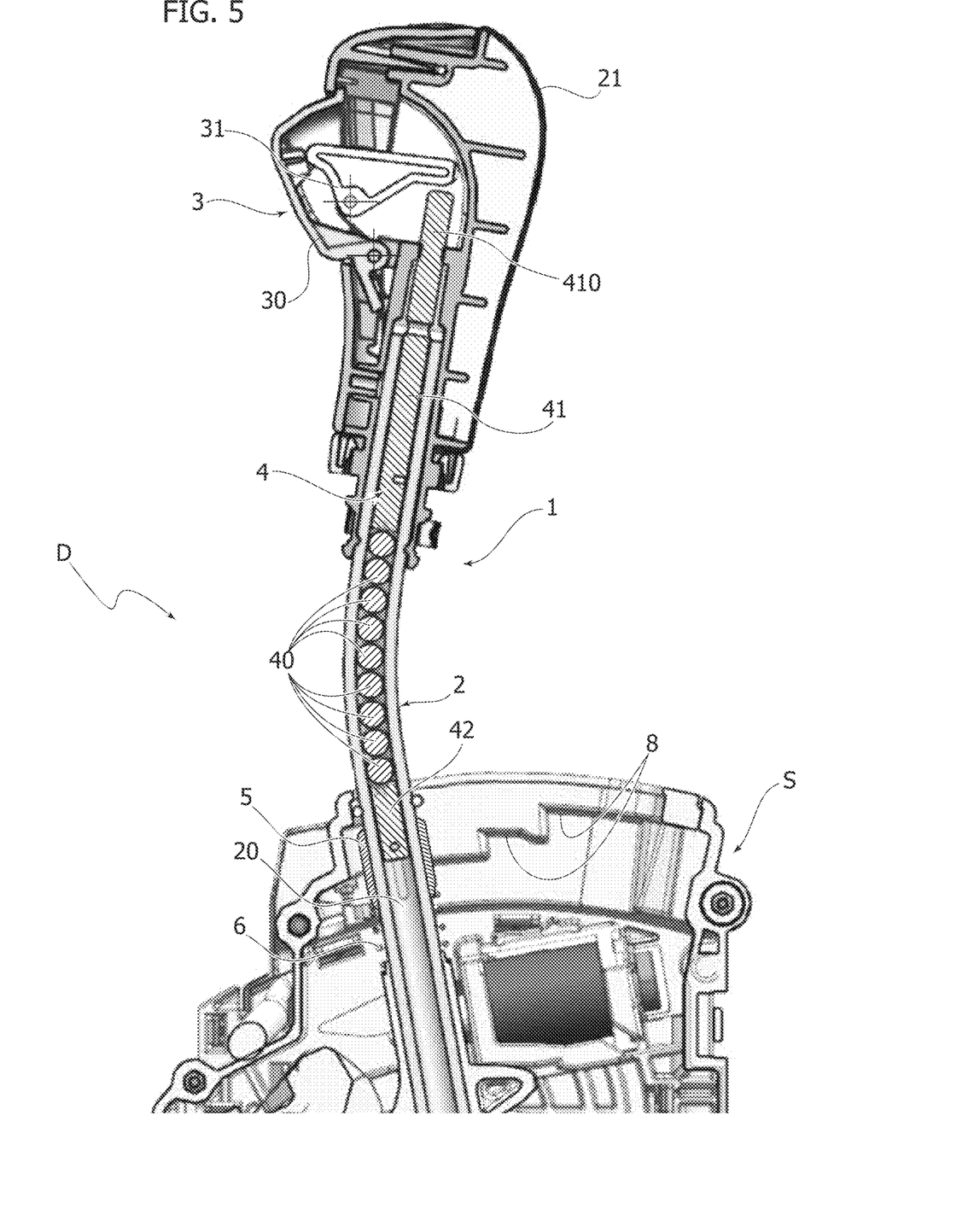

As illustrated, in particular, in the cross-sectional views shown in FIGS. 4 and 5, the spherical elements 40 have a diameter substantially corresponding to the inner diameter of the inner passage 20 of the elongated body 2. Moreover, the spherical elements 40 are arranged in mutual contact within the elongated body 2 along its main axis. Therefore, in the zone in which are provided said spherical elements 40, the transmission member 4 does not include any kind of interconnecting elements interposed between the spheres.

According to the preferred embodiment illustrated in the drawings, the transmission member 4 also comprises a first rigid rod 41 interposed between the actuating member 3 and the aforesaid plurality of spherical elements 40 arranged within the elongated body 2 of the lever 1.

In an analogous manner to the known type of lever, the actuating member 3 is arranged at the handle 21, and comprises a push-button 30 projecting from the handle 21, and an operating arm 31 arranged within the handle 21 and interposed between the push-button 30 and the transmission member 4, so as to transmit a movement of the push-button 30 to the transmission member 4, in particular, to the first rigid rod 41. The first rigid rod 41 has an upper end portion 410 which, in a locking position of the lever 1, protrudes outside the inner passage 20 and in the vicinity of the operating arm 31 arranged within the handle 21 (FIG. 5).

The transmission member 4 further comprises a rigid terminal rod 42 arranged near the lower portion of the elongated body 2 arranged within the support structure S, in such a way that the spherical elements 40 are interposed between the first rigid rod 41 and the aforesaid terminal rod 42.

As indicated above, the transmission member 4 is configured to transmit the movement of the actuating member 3 to the controlled member 5. In the embodiment illustrated in the drawings, the controlled member 5 is an engaging member elastically biased into a locking position, for locking the gear lever 1 in an operating position. The engaging member can be of any type, for example, a stop element shaped like a bushing, slidably mounted outside the elongated body at a lower portion thereof. As illustrated in particular in FIG. 4-6, the stop element is operatively connected to the terminal rod 42 by means of fastening elements of any type.

As indicated above, according to an essential characteristic of the invention, the transmission member 4 comprises a plurality of spherical elements 40 arranged in series within the inner passage 20 of the elongated body 2 of the lever 1. According to the embodiment shown in the drawings, the elongated body 2 of the lever 1 has a curvilinear profile at the lever portion within which the spherical elements 40 are arranged. The provision of a transmission member that includes a plurality of spherical elements arranged in series makes it possible to adopt any configuration for the elongated body 2 of the gear lever of the gearbox, including the curved configuration shown here, by way of example, since the train of spherical elements is able to flow even through a curved passage. Of course, the size of the spherical elements, and consequently the diameter of the inner passage 20, are chosen by the designer as a function of the radius of curvature of the body 2, so as to ensure—on one hand—the correct movement of the train of spheres within the curved passage and—on the other hand—to allow a reliable transmission of the force transmitted to the actuating member. It is evident that, for a given diameter of the spherical elements, the radius of curvature of the body 2 cannot be less than a limit value. It is, however, equally evident that the invention gives the designer a much greater freedom of choice for the configuration of the gear lever. Thanks to the aforesaid characteristics, it is therefore possible to optimally adapt the shape of the lever 1 to the available spaces and to the ergonomic needs that characterize the vehicle, or the vehicles, on which it must be applied.

The spherical elements 40 can be made of metal material, for example, of steel, or with other materials (for example, plastic or rubber). Each spherical element 40 can be made hollow and with a main wall forming a rigid element, configured to limit possible deformations due to the mutual sphere-to-sphere contact or to the sphere 40-to-rigid rod 41, 42 contact.

The spherical elements 40 are sized to allow easy sliding within the inner passage 20, also at a curvilinear profile of the elongated body, in both directions along the main axis of the inner passage 20 of the body 2. Moreover, depending on the choice of materials to produce the spherical elements 40 and the inner passage 20 of the gear lever, the spherical elements 40 can be lubricated, to facilitate their sliding within the inner passage 20. Alternatively, the spherical elements 40 can be slidably mounted within the inner passage 20 without the aid of lubricating materials.

Figure 6:
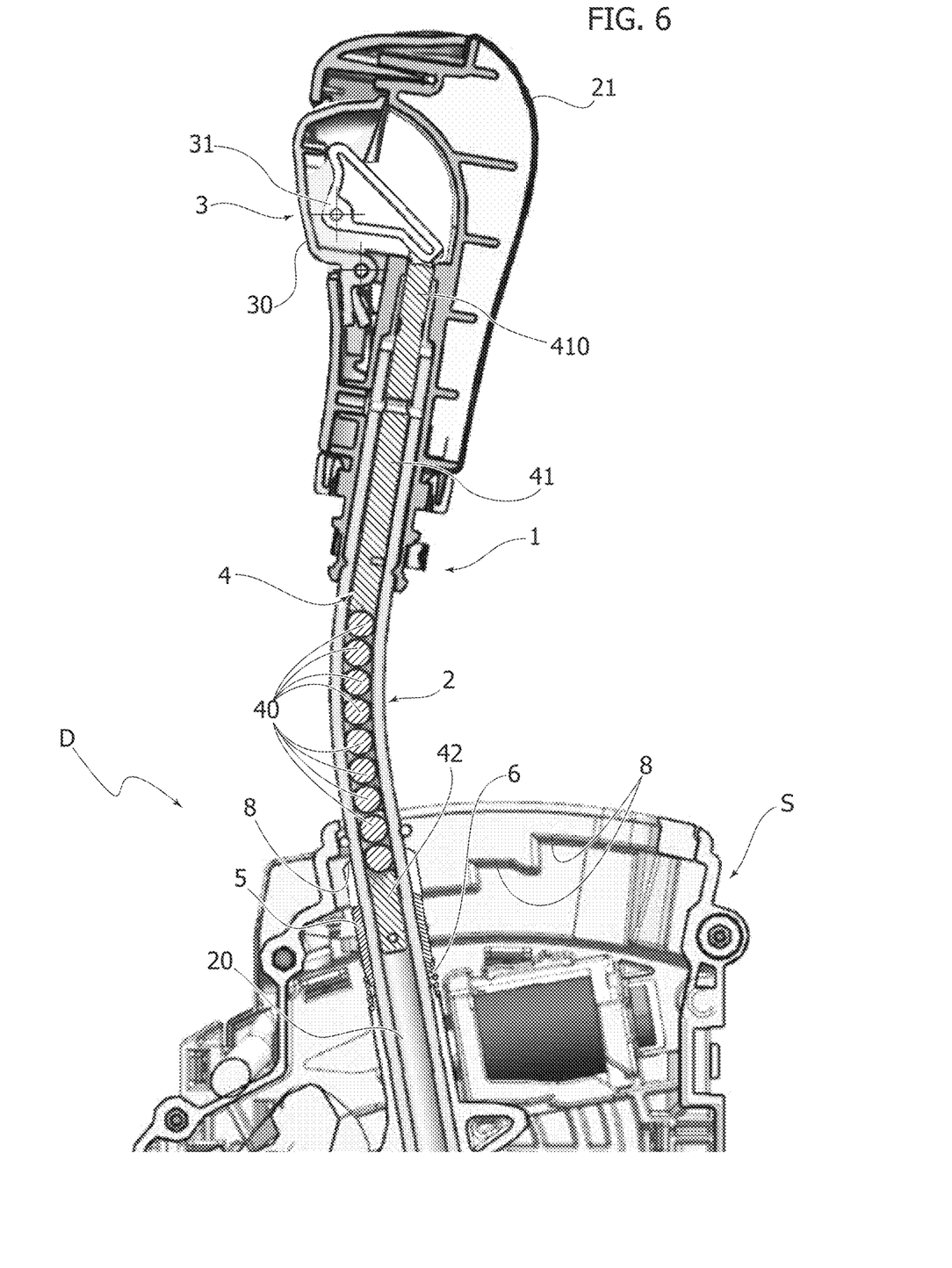
FIG. 6 illustrates a further cross-sectioned view of the lever of FIGS. 3-5, in which the controlled member is in a position distanced from the locking position.

FIG. 6 illustrates the preferred embodiment of the gear lever 1 according to the present invention, when the stop element 5 is in a position distanced from a corresponding seat 8 arranged within the support structure S, following actuation of the actuating member 3 and the consequent sliding of the transmission member 4 within the elongated body 20. Following pressure on the push-button 30 and a corresponding rotation of the operating arm 31, the first rigid rod 41, the spherical elements 40 and the terminal rod 42 slide downwards within the body 2 in the direction of the support structure S. Sliding of the terminal rigid rod 42 carries the engaging member 5 away from the locking position defined by one of the seats 8, and consequently, the gear lever 1 can be rotated freely forwards or backwards to change its operating position.

In the same manner as for the lever of the known type described at the beginning of the present description, the lever 1 comprises spring means 6 configured to recall the engaging member into one of the seats 8 and then into a locking position. As illustrated in the drawings, the spring means can be produced in any known way, for example in the form of a helical spring arranged in contact with the stop element.

Of course, the present invention can also be applied in the case in which, following actuation of the actuating member, the rigid rod and the transmission member slide within the inner passage in an opposite direction with respect to that illustrated in the attached drawings, carrying the engaging member away from the locking position defined by seats which are configured overturned by 180° with respect to that illustrated in the drawings.

Thanks to the characteristics described above, the gear lever achieves all the objectives illustrated above, and is simple to construct, with a low cost and reduced bulk.

Of course, without prejudice to the principle of the invention, the details of construction and the embodiments may vary widely with respect to those described and illustrated purely by way of example, without departing from the scope of the present invention.

What is claimed is:

1. A gear lever for a motor-vehicle gearbox comprising:
an elongated body,
an actuating member arranged on the elongated body of the gear lever,
a transmission member arranged within an inner passage of the elongated body of the gear lever, operatively connected to said actuating member and configured to transmit movement of the actuating member to a controlled member,
wherein said transmission member comprises a plurality of spherical elements arranged in series within said inner passage of said elongated body, and
wherein in a zone in which are provided said plurality of spherical elements, the transmission member does not include any kind of interconnecting elements interposed between the plurality of spherical elements.

2. The gear lever according to claim 1, wherein said controlled member is an engaging member elastically biased into a locking position, for locking the gear lever in an operative position.

3. The gear lever according to claim 2, wherein said elongated body has a handle at one of its ends, said actuating member being arranged in proximity to said handle, for controlling a movement of said engaging member away from the locking position.

4. The gear lever according to claim 3, wherein said transmission member further comprises a first rigid rod, slidably mounted within the inner passage of said elongated body and operationally interposed between said actuating member and said plurality of spherical elements.

5. The gear lever according to claim 4, wherein said actuating member comprises a push-button arranged on said handle and an operative arm for transmitting a movement of the actuating member to said first rigid rod.

6. The gear lever according to claim 4, wherein said transmission member further comprises a rigid terminal rod, said plurality of spherical elements being interposed between said first rigid rod and said terminal rod.

7. The gear lever according to claim 1, wherein the plurality of spherical elements have a diameter substantially corresponding to an inner diameter of the inner passage of said elongated body, and are arranged in mutual contact within said elongated body along a main axis thereof.

8. The gear lever according to claim 1, further comprising a spring arrangement for biasing said controlled member into the locking position.

9. The gear lever according to claim 1, wherein said elongated body has a curvilinear profile within which the plurality of spherical elements are arranged.

10. The gear lever according to claim 1, wherein the plurality of spherical elements are of plastic material.

11. The gear lever for a motor-vehicle gearbox according to claim 1, wherein the plurality of spherical elements are of metal material.

12. The gear lever according to claim 1, wherein the plurality of spherical elements are lubricated to facilitate sliding within the elongated body of the gear lever.

13. A control device for a motor-vehicle gearbox comprising a support structure and a gear lever according to claim 1, mounted pivoting above said support structure, said elongated body of the gear lever having a lower portion arranged within said support structure.

14. The control device according to claim 13, wherein said support structure comprises a plurality of seats formed within said support structure and configured to selectively receive said controlled member, in order to define corresponding operating positions of the gear lever of the gearbox.

15. A motor-vehicle comprising a control device according to claim 13, wherein said support structure is anchored to a floor of the motor-vehicle and said gear lever is mounted pivoting above said support structure, about an axis that is horizontal and transverse with respect to a longitudinal direction of the motor-vehicle.

16. A gear lever for a motor-vehicle gearbox, comprising:
an elongated body,
an actuating member arranged on the elongated body of the gear lever,
a transmission member arranged within an inner passage of the elongated body of the gear lever, operatively connected to said actuating member and configured to transmit movement of the actuating member to a controlled member,
wherein:
  said transmission member comprises a plurality of spherical elements arranged in series within said inner passage of said elongated body,
  said controlled member is an engaging member elastically biased into a locking position, for locking the gear lever in an operative position,
  said elongated body has a handle at one of its ends, said actuating member being arranged in proximity to said handle for controlling a movement of said engaging member away from the locking position,
  said transmission member further comprises a first rigid rod slidably mounted within the inner passage of said elongated body and operationally interposed between said actuating member and plurality of spherical elements,
  said transmission member further comprises a rigid terminal rod, said plurality of spherical elements being interposed between said first rigid and said terminal rod, and
  said elastically biased engaging member is a stop element shaped like a bushing, slidably mounted on an outside of said elongated body at a lower portion thereof, said stop element being operatively connected to said terminal rod.

* * * * *